United States Patent [19]
Pengov et al.

[11] Patent Number: 6,114,789
[45] Date of Patent: Sep. 5, 2000

[54] SWITCHED RELUCTANCE MOTOR

[75] Inventors: Wayne A. Pengov; Douglas L. Carr, both of Chardon, Ohio

[73] Assignee: Tridelta Industries, Inc., Mentor, Ohio

[21] Appl. No.: 09/444,738

[22] Filed: Nov. 22, 1999

Related U.S. Application Data

[63] Continuation of application No. 09/178,862, Oct. 26, 1998, Pat. No. 6,028,385, which is a continuation-in-part of application No. 08/545,085, Oct. 19, 1995, Pat. No. 5,852,334.

[51] Int. Cl.⁷ .................................................. H02K 19/06
[52] U.S. Cl. .......................... 310/166; 310/216; 310/168; 310/269
[58] Field of Search ..................... 310/166, 168, 310/254, 261, 216, 49 R, 162, 179, 269

[56] References Cited

U.S. PATENT DOCUMENTS

| | | | |
|---|---|---|---|
| 1,234,914 | 7/1917 | Latour | 310/111 |
| 1,250,752 | 12/1917 | Alexanderson | 310/111 |
| 1,597,453 | 8/1926 | Merrill | 310/111 |
| 1,799,156 | 4/1931 | Dornig | 310/168 |
| 2,732,509 | 1/1956 | Hammerstrom et al. | 310/168 |
| 3,098,164 | 7/1963 | Inoue | 310/111 |
| 3,732,561 | 5/1973 | McGinnis | 340/378 R |
| 4,491,790 | 1/1985 | Miller | 324/142 |
| 4,575,652 | 3/1986 | Gogue | 310/49 R |
| 4,583,015 | 4/1986 | Toshimitsu | 310/187 |
| 4,626,719 | 12/1986 | Foster | 310/49 R |
| 4,748,362 | 5/1988 | Hedlund | 310/168 |
| 4,766,359 | 8/1988 | Smith et al. | 318/652 |
| 4,883,999 | 11/1989 | Hendershot | 310/254 |
| 4,995,159 | 2/1991 | Hancock et al. | 29/596 |
| 4,998,052 | 3/1991 | Erdman et al. | 318/701 |
| 5,023,502 | 6/1991 | Johnson | 310/261 |
| 5,075,610 | 12/1991 | Harris | 318/701 |
| 5,111,095 | 5/1992 | Hendershot | 310/168 |
| 5,111,096 | 5/1992 | Horst | 310/168 |
| 5,122,697 | 6/1992 | Horst | 310/181 |
| 5,294,856 | 3/1994 | Horst | 310/181 |
| 5,517,102 | 5/1996 | Jensen | 318/701 |
| 5,545,938 | 8/1996 | Mecrow | 310/156 |
| 5,604,388 | 2/1997 | Baker et al. | 310/51 |
| 5,652,493 | 7/1997 | Hendershot, Jr. | 318/701 |
| 5,701,065 | 12/1997 | Ishizaki | 318/701 |
| 5,719,453 | 2/1998 | Horst | 310/68 R |
| 5,719,456 | 2/1998 | Kolomeitsev | 310/112 |
| 5,747,962 | 5/1998 | Fulton | 318/701 |
| 5,844,343 | 12/1998 | Horst | 310/184 |
| 5,852,334 | 12/1998 | Pengov | 310/168 |

FOREIGN PATENT DOCUMENTS

| | | |
|---|---|---|
| 0 695020 A2 | of 0000 | European Pat. Off. . |
| 733158 | of 0000 | United Kingdom . |
| WO 97/15108 | of 0000 | WIPO . |

OTHER PUBLICATIONS

T. J. E. Miller; Switched Reluctance Motors and Their Control, 1993, pp. 2–3, 8–9, 14–15, 26–47, New York.

*Primary Examiner*—Clayton LaBalle
*Assistant Examiner*—Karl Imayoshi E. Tamai
*Attorney, Agent, or Firm*—Mark Kusner

[57] ABSTRACT

A switched reluctance motor comprised of a stator having a plurality of evenly spaced, radially oriented, like stator poles that define a gap between adjacent stator poles. Windings for three phases are wound about the stator poles wherein a stator pole of a first phase is disposed circumferentially between a winding and an associated stator pole of a second phase and a winding and an associated stator pole of a third phase. A rotor is mounted for rotation relative to the stator. The rotor has an even number of rotor poles, the rotor poles being dimensioned such that when one of the phases is energized, the rotor poles operatively interact with the energized stator poles such that the motor moves from a first state wherein half of the rotor poles are magnetically coupled to a like number of the stator poles to a second state wherein all of said rotor poles are magnetically coupled to a like number of stator poles.

6 Claims, 8 Drawing Sheets

(0 DEG.)

(22.5 DEG.)

(30 DEG.)

(45 DEG.)

SWITCHED RELUCTANCE MOTOR

"This application is a continuation of application Ser. No. 09/178,862 filed on Oct. 26, 1998, which is now U.S. Pat. No. 6,028,385 which is a continuation-in-part of application Ser. No. 08/545,085, filed on Oct. 19, 1995, which is now U.S. Pat. No. 5,852,334."

FIELD OF THE INVENTION

The present invention relates generally to switched reluctance motors.

BACKGROUND OF THE INVENTION

U.S. patent application Ser. No. 08/545,085 to Pengov discloses a two-phase switched reluctance motor having a rotor with wide rotor poles and narrow rotor poles. During each phase energization, the rotor is sequentially advanced in a two-step fashion, wherein, during the first step, the leading edge of a wide rotor pole interacts with a first energized stator pole. During the second step, a narrow rotor pole is drawn into alignment with a second energized stator pole.

The present invention relates to the motor disclosed in U.S. patent application Ser. No. 08/545,085 and improvements thereto.

SUMMARY OF THE INVENTION

In accordance with the present invention, there is provided a switched reluctance motor, comprising a stator having a plurality of evenly spaced, radially oriented, like stator poles that define a gap between adjacent stator poles. Windings for three phases are wound about the stator poles wherein a stator pole of a first phase is disposed circumferentially between a winding and an associated stator pole of a second phase and a winding and an associated pole of a third phase. A rotor element is mounted for rotation relative to the stator. The rotor element has two diametrically opposite, outwardly projecting wide rotor poles, and two diametrically opposite, outwardly projecting narrow rotor poles. Each of the wide rotor poles has a wide rotor pole face and each of the narrow rotor poles has a narrow rotor pole face. The rotor poles are distributed on the rotor wherein a narrow rotor pole is disposed to each side of a wide rotor pole in a direction of rotation. The rotor poles are dimensioned such that the narrow pole face is approximately equal to a stator pole face and the wide rotor pole face spans at least the pole face of a first stator pole and the gap adjacent the first stator pole.

In accordance with another aspect of the present invention, there is provided a switched reluctance motor comprising a stator having a plurality of evenly spaced, radially oriented, like stator poles that define a gap between adjacent stator poles. Windings for three phases are wound about the stator poles wherein a stator pole of a first phase is disposed circumferentially between a winding and an associated stator pole of a second phase and a winding and an associated pole of a third phase. A rotor is mounted for rotation relative to the stator. The rotor has an even number of rotor poles. The rotor poles are dimensioned such that when one of the phases is energized, the rotor poles operatively interact with the energized stator poles such that the motor from a first state wherein half of the rotor poles are magnetically coupled to a like number of the stator poles and a second state wherein all of the rotor poles are magnetically coupled to a like number of stator poles.

In accordance with another aspect of the present invention, there is provided a switched reluctance motor comprising a stator having a plurality of spaced apart, radially oriented stator poles that define a gap between adjacent stator poles. Windings for three phases are wound about the stator poles wherein a stator pole of a first phase is disposed circumferentially between a winding and an associated stator pole of a second phase and a winding and an associated pole of a third phase. A rotor element is mounted for rotation relative to the stator. The rotor element has a wide rotor pole having a wide rotor pole face and a narrow rotor pole having a narrow rotor pole face. The rotor poles are distributed on the rotor element wherein the narrow rotor pole and the wide rotor pole travel along a same circumferential path. The rotor poles are dimensioned such that energization of one of the phases causes a predetermined angular rotation of the rotor wherein a first portion of the angular rotation is created by the wide rotor pole being drawn into a minimum reluctance position relative to one of the energized stator poles and the other portion of the angular rotation is created by the narrow rotor pole being drawn into a minimum reluctance position with another of the energized stator poles. The wide rotor pole is in a minimum reluctance position when the narrow rotor pole is in a minimum reluctance position.

In accordance with another aspect of the present invention, there is provided a switched reluctance motor comprising a stator having a plurality of radially oriented stator poles. Windings for three phases are wound about the stator poles wherein a stator pole of a first phase is disposed circumferentially between a winding and an associated stator pole of a second phase and a winding and an associated pole of a third phase. A rotor is mounted for rotation relative to the stator. The rotor has a wide rotor pole and a narrow rotor pole. The rotor poles are distributed on the rotor wherein a narrow rotor pole is disposed to each side of a wide rotor pole in a direction of rotation. The rotor poles are dimensioned such that the energization of one of the phases causes the wide rotor pole to interact with a first energized stator pole to induce a first torque on the rotor and to produce a first predetermined angular rotation of the rotor, and thereafter causes the narrow rotor pole to interact with a second energized stator pole to induce a second torque on the rotor and to produce a second predetermined angular rotation of the rotor.

It is an object of the present invention to provide a switched reluctance motor exhibiting improved torque characteristics at all positions of the rotor relative to the stator.

It is another object of the present invention to provide a switched reluctance motor as described above exhibiting reduced torque ripple.

It is another object of the present invention to provide a switched reluctance motor as described above that during each phase energization has a first state wherein a predetermined number of rotor and stator poles are magnetically coupled and a second state wherein twice said predetermined number of rotor and stator poles are magnetically coupled.

It is another object of the present invention to provide a switched reluctance motor as described above having two or more phases.

It is another object of the present invention to provide a switched reluctance motor as described above that is bidirectional.

Another object of the present invention is to provide a switched reluctance motor as described above adapted for reciprocal motion.

A still further object of the present invention is to provide a switched reluctance motor as described above wherein the rotor is comprised of a plurality of stacked laminations formed of a magnetically permeable material.

A still further object of the present invention is to provide a switched reluctance motor as described above wherein the rotor is comprised of a plurality of rotor sections.

A still further object of the present invention is to provide a switched reluctance motor as described above wherein each lamination forming the rotor or rotor section is identical.

These and other objects and advantages will become apparent from the following description of preferred embodiments of the present invention taken together with the accompanying drawings.

BRIEF DESCRIPTION OF THE DRAWINGS

The invention may take physical form in certain parts and arrangement of parts, preferred embodiments of which will be described in detail in the specification and illustrated in the accompanying drawings which form a part hereof, and wherein.

DETAILED DESCRIPTION OF PREFERRED EMBODIMENTS

Figure 1:
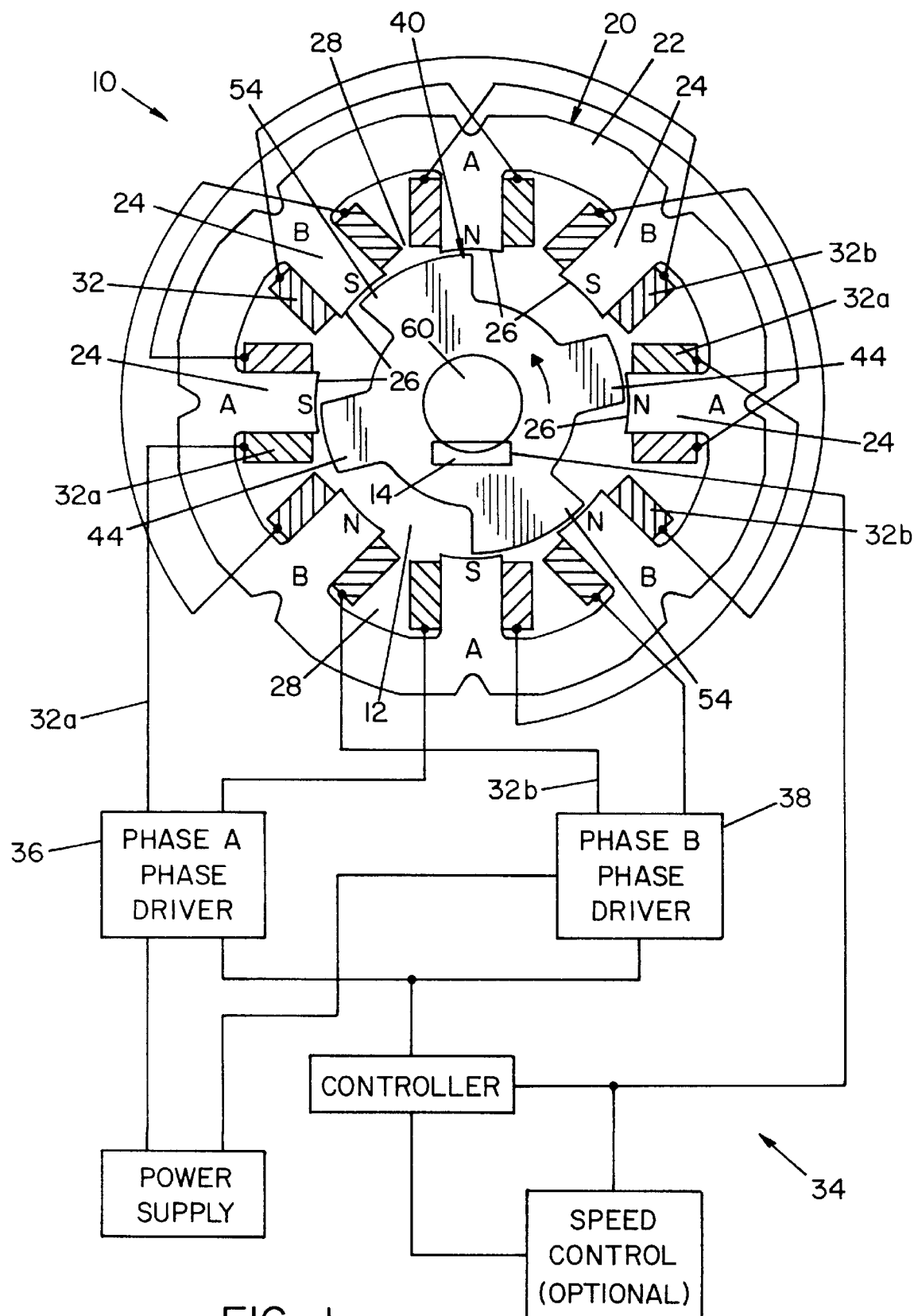
FIG. 1 is a sectional view of an 8/4, two phase switched reluctance motor illustrating a preferred embodiment of the present invention.

Referring now to the drawings wherein the showings are for the purpose of illustrating preferred embodiments of the invention only, and not for the purpose of limiting same, FIG. 1 shows a cross-sectional view of a two-phase switched reluctance motor 10 illustrating a preferred embodiment of the invention.

Broadly stated, FIG. 1 shows an 8/4 motor 10, i.e., a motor having a stator with eight stator poles and a rotor with four rotor poles. The rotor includes two wide rotor poles that are diametrically opposite each other and extend along the entire axial length of the rotor. During each phase energization, four of the eight stator poles are energized. Energization of a particular phase causes the rotor to rotate in a two-step manner. The first step or portion of the angular rotation is created by the leading half of the two diametrically opposite wide rotor poles moving into minimum reluctance relationship with a pair of diametrically opposite energized stator poles. The second half or portion of the angular rotation of the rotor is created as two narrow rotor poles interact with the remaining two opposite energized stator poles.

Referring now to the present invention, motor 10 is comprised of a stator 20 and a rotor 40. Stator 20 is comprised of a stack of plate laminations 22 that are formed of a ferromagnetic material. Laminations 22 are stacked face-to-face and suitably adhered to one another by means conventionally known in the art. Stator 20 includes a plurality of like, inwardly extending stator poles 24 having inwardly facing concave stator pole faces 26. In the embodiment shown, stator 20 has eight (8) stator poles, designated 24a, 24b, 24c, 24d, 24e, 24f, 24g and 24h. A gap 28 is defined between adjacent stator poles 24. Stator pole faces 26 define a central bore 12 for receiving rotor 40. Phase windings 32a, 32b are alternately wound about every other stator pole 24 such that for every stator pole 26 of one polarity there is a corresponding pole of an opposite polarity.

As schematically illustrated in FIG. 1, windings 32a, 32b are connected to an electrical current pulse generating circuit 34 having a phase A driver 36 and a phase B driver 38. Windings 32a are connected to phase A driver 36 and windings 32b are connected to phase B driver 38, as shown in FIG. 1, to create stator poles of two phases, A and B. A power supply 35 is connected to phase A driver 36 and phase B driver 38. In the embodiment shown in FIG. 1, stator poles 24a, 24c, 24e and 24g are connected as A phase stator poles, and stator poles 24b, 24d, 24f and 24h are connected as B phase stator poles. As shown in FIG. 1, adjacent stator poles 24 have a different phase, and diametrically opposed stator poles 24 have opposite polarities. As illustrated in FIG. 1, phase A windings 32a and phase B windings 32b are series connected such that current flows through the phase windings only in one direction. It is to be appreciated, however, that the phase windings could be parallel connected, or combination series-parallel connected, to their respective sources of switched current.

The current pulse generating circuit 34 is conventional in the art and is operable to selectively generate pulses of electrical current through windings 32a, 32b. The timing of current pulses generated by current pulse generating circuit 34 is determined by a position sensor 14. Position sensor 14 may be a Hall effect sensor, a resolver or an encoder. Alternatively, self-inductance of phase windings 32a, 32b may be used to indicate the position of the rotor relative to the stator. Position sensor 14 is located on shaft 60 of motor 10 and provides a signal indicative of the relative position of rotor 40 relative to stator 20. Position sensor 14 has an output connected to a controller 37 for reporting the angular position of rotor 40 relative to stator 20. Controller 37 is connected to phase A and phase B phase drivers 36, 38 for controlling the firing of the respective phases in accordance with the position of rotor 40 relative to stator 20. An optional speed control 39 connected to controller 37 provides for adjustment of the rotational speed of rotor 40. In the embodiment shown in FIGS. 1–5, motor 10 is a unidirectional motor in which rotor 40 rotates in a counterclockwise (CCW) direction with respect to stator 20. It will of course be appreciated that the motor could be designed for clockwise (CW) rotation and that the direction of rotation is not to be construed as limiting the invention.

Referring now to rotor 40, in the embodiment shown, rotor 40 is disposed within central bore 12 defined by stator pole faces 26. Like stator 20, rotor 40 is comprised of a stack of plate laminations that are formed of a ferromagnetic material.

Figure 2:
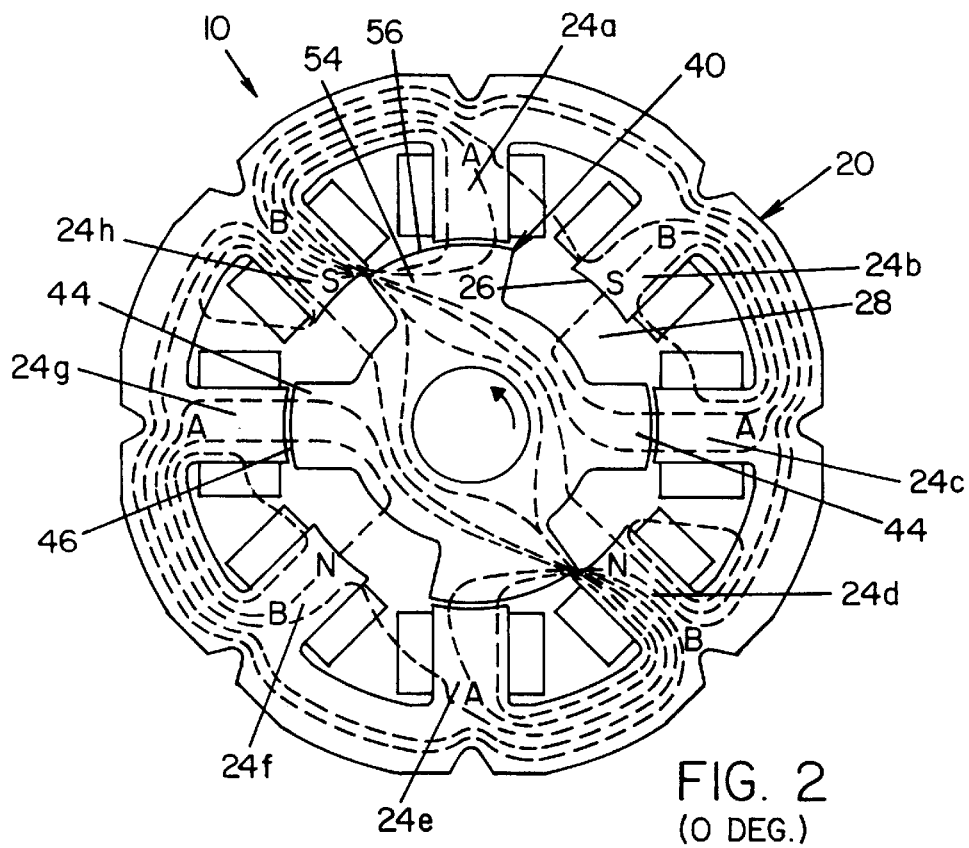
FIGS. 2–4 are sectional views of the motor shown in FIG. 1, showing magnetic flux patterns and the progression of the rotor during energization of phase B.
Figure 3:
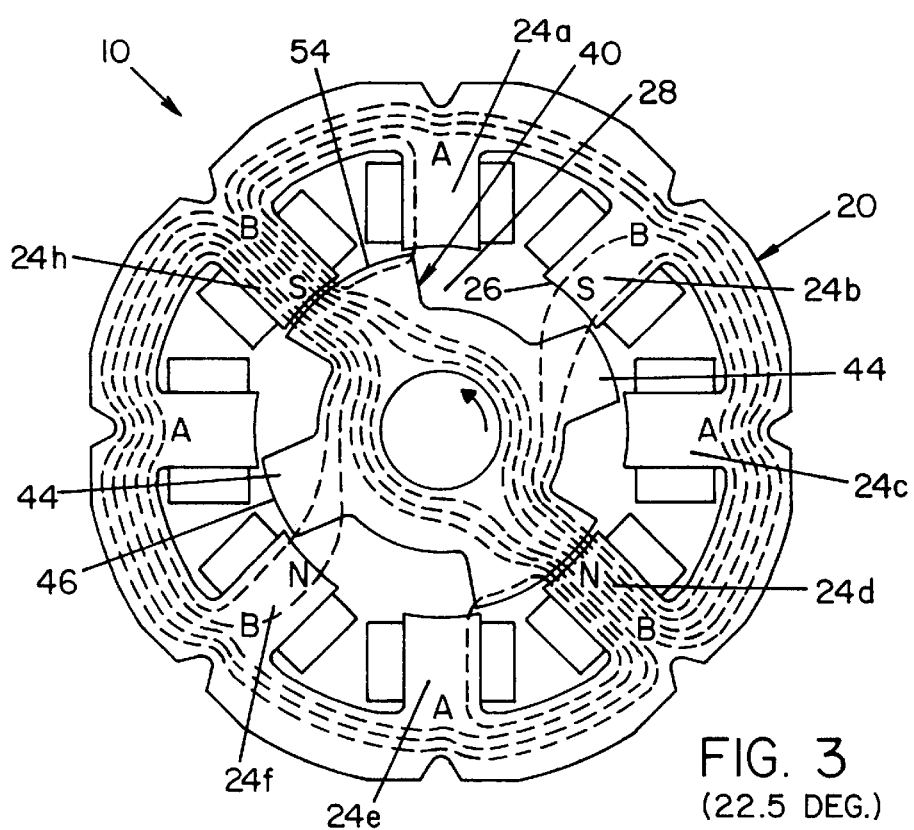
Figure 4:
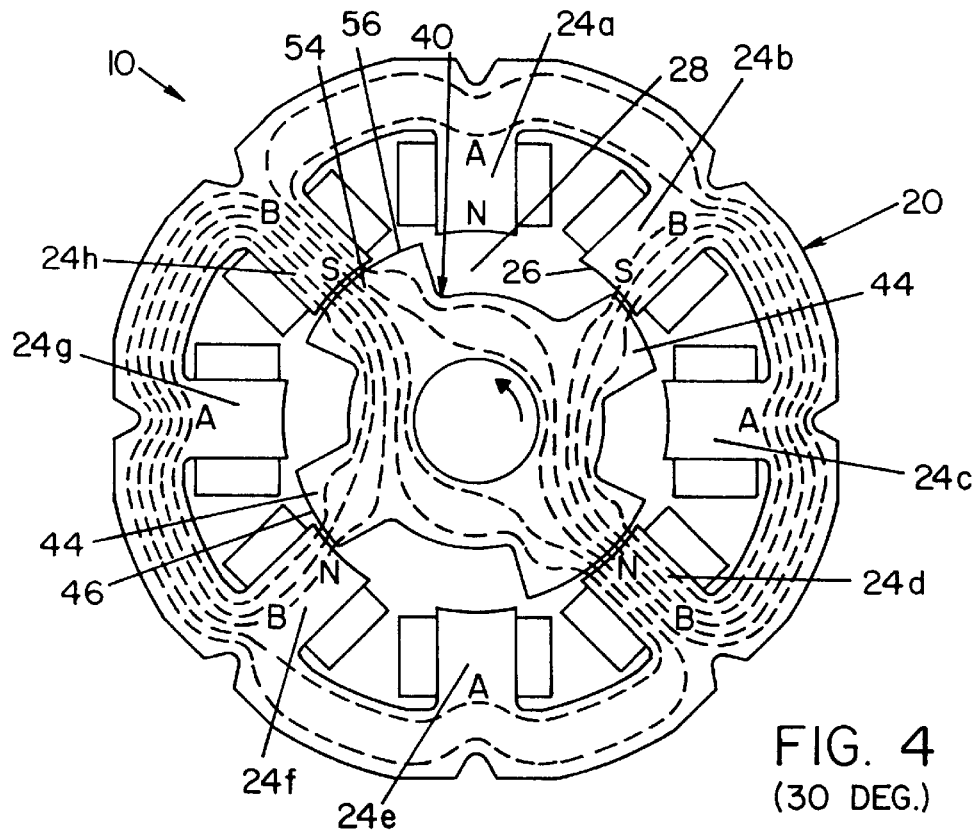
Figure 5:
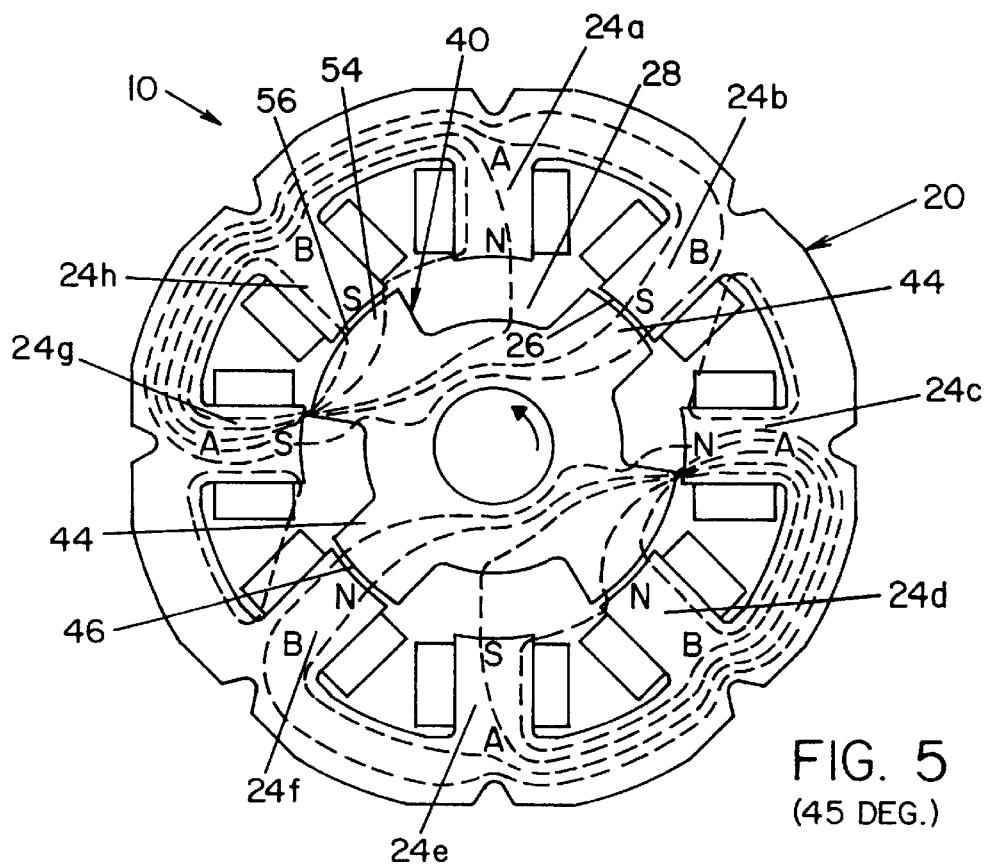
FIG. 5 is a sectional view of the motor shown in FIG. 1, showing flux patterns at the initiation of phase A.

As seen in FIGS. 1–5, rotor 40 has diametrically opposed narrow rotor poles 44 having narrow rotor pole faces 46, and diametrically opposed wide rotor poles 54 having wide rotor pole faces 56. Narrow rotor pole face 46 is dimensioned to be slightly larger (preferably less than 2 radial degrees) than a stator pole face 26. Wide rotor pole face 56 is dimensioned to be slightly larger than one stator pole face 26 and a gap 28 adjacent thereto. Narrow rotor poles 44 and wide rotor poles 54 are oriented relative to each other such that each narrow rotor pole face is in alignment (i.e., spans) a stator pole face 26 when each wide rotor pole face 56 spans a stator pole face 26 and an adjacent gap 28, as best illustrated in FIGS. 2 and 5.

In the preferred embodiment shown in FIGS. 1–5, at the circumference of rotor 40, wide rotor pole face 56 of wide rotor pole 54 is twice as wide as narrow rotor pole face 40 of narrow rotor pole 44. At the inside circumference of stator 20, stator pole face 26 of stator poles 24 are approximately the same width as narrow rotor pole face 40 of narrow rotor pole 44 and the distance, i.e., gap 28, between adjacent stator poles 24 is approximately the width of stator pole face 26.

Referring now to FIGS. 2–4, the counterclockwise progression of rotor 40 relative to stator 20, in response to the excitation of phase B windings 32b, is illustrated. In FIGS. 2–5, phase windings 32a, 32b, phase A and phase B drivers 36, 38, controller/power supply 37, speed control 39 and position sensor 14 of FIG. 1 have been omitted to facilitate uncluttered views of rotor 40 and stator 20. To further facilitate an understanding of when the omitted phase windings 32a, 32b are energized, stator poles 24 associated with an excited phase are marked with either an 'N' or an 'S' to signify a north or south pole respectively.

Referring now to the operation of motor 10, FIG. 2 shows the position of rotor 40 relative to stator 20, where phase B is energized. When phase B is energized, the leading edges of wide rotor poles 54 will be drawn to positions of minimum reluctance with respect to the energized stator poles 24. Specifically, when phase B is energized, wide rotor poles 54 will be drawn into minimum reluctance position with energized stator poles 24d and 24h, the minimum reluctance position being where the leading half of wide rotor pole 54 overlaps and is in alignment with stator poles 24d and 24h. The interaction between wide rotor poles 54 of rotor 20 and energized stator poles 24d and 24h produces the first half of the phase B angular rotation. Further rotation of rotor 40 is created by narrow poles 44 being drawn into minimum reluctance position with each of the energized stator poles 24. Specifically, narrow rotor poles 44 of rotor 40 move into minimum reluctance relationship (i.e., into alignment) with energized stator poles 24b and 24f.

Starting from the zero degree rotor position shown in FIG. 2, controller 37 causes phase B driver 38 to energize phase B windings 32b in the absence of excitation of phase A windings 32a. This excitation produces a torque on rotor 40 causing rotor 40 to rotate counterclockwise and to align wide rotor poles 54 with excited phase B stator poles 24d and 24h, i.e., wide rotor poles 54 move into minimum reluctance position with respect to phase B stator poles 24d, 24h—the minimum reluctance position corresponding to the maximum inductance of the energized phase windings producing the alignment. In FIG. 3, at 22.5 degrees rotor position, wide rotor poles 54 and adjacent energized phase B stator poles 24d, 24h are in a minimum reluctance position with respect to each other as a result of a constant gap being formed therebetween. However, the inductance of the phase B windings 32b increases due to the narrow rotor poles 44 moving to a minimum reluctance position with energized stator poles 24b and 24f. Accordingly, rotor 40 experiences a torque due to the interaction of narrow rotor poles 44 with energized phase B windings 32b while experiencing little or no torque from the interaction of wide rotor poles 54 with energized phase B windings 32b. In this manner, torque experienced by rotor 40 shifts from wide rotor poles 54 to narrow rotor poles 44. In FIG. 4, at 30 degrees rotor position, rotor 40 experiences torque from energized phase B windings 32b in cooperation with the increasing inductance thereof caused by narrow rotor poles 44 moving to a minimum reluctance position with phase B stator poles 24b and 24f. It is to be appreciated that between 22.5 and 45 degrees rotor position, the overlap (and therefore the reluctance) between wide rotor poles 54 and stator poles 24d and 24h is substantially constant and therefore rotor 40 experiences no torque from interaction of energized phase B windings 32b and wide rotor poles 54. In FIG. 5, at 45 degrees rotor position, wide and narrow rotor poles 54, 44 are in minimum reluctance position with energized phase B stator poles 24d–24h and 24b–24f, respectively. Accordingly, at this position no torque is imparted to rotor 40 from the energization of the phase B windings 32b.

In like fashion, energizing phase A windings 32a (with rotor 40 at 45 degrees rotor position shown in FIG. 5) rotates rotor 40 an additional 45 angular degrees. Energization of phase A windings 32a causes flux to flow from phase A poles 24c and 24g through wide rotor poles 54 (not shown). In response to flux flowing therethrough, rotor 40 experiences a torque causing rotor 40 to rotate further in a counterclockwise direction and to align wide poles 54 with stator poles 24c, 24g of excited phase A windings 32a, in a manner as previously described. As rotor 40 moves past the 45 degrees rotor position, however, energized phase B windings 32b experience a decrease in inductance due to the increasing reluctance between stator poles 24b, 24d, 24f and 24h of phase B windings 32b and rotor poles 44, 54. To avoid having rotor 40 experience a (negative) torque from energization of phase B windings 32b in cooperation with the decreasing inductance thereof, phase B windings 32b are deenergized. In this manner, the torque experienced by rotor 40 shifts from phase B windings 32b to phase A windings 32a.

FIGS. 2–4 show magnetic flux patterns corresponding to the position of rotor 40 and energizations of phase B. In FIGS. 2 and 3, between 0 and 22.5 degrees rotor position, a greater amount of flux flows through wide rotor poles 54 than through narrow rotor poles 44. Referring to FIGS. 4 and 5, between 22.5 and 30 degrees rotor position, the amount of flux passing through narrow rotor poles 44 increases as narrow rotor poles 44 move into minimum reluctance position with stator poles 24b and 24f. With reference to FIG. 5, at 45 degrees rotor position, phase B windings 32b are deenergized and phase A windings 32a are energized such that flux flowing through rotor 40 shifts from phase B windings 32b to phase A windings 32a, thereby producing flux patterns through wide rotor poles 44, as shown in FIG. 5.

In the foregoing description, rotor 40 is advanced through 45 mechanical degrees by the energization of phase B and deenergization of phase A. It is to be appreciated, however, that the above description is extendable to movement of rotor 40 beyond 45 mechanical degrees by similar energization of phase A. Moreover, it is to be appreciated that the increasing or decreasing inductance of a phase winding corresponds to the respective decreasing or increasing reluctance in the magnetic flux path associated with the phase winding.

Figure 6A:
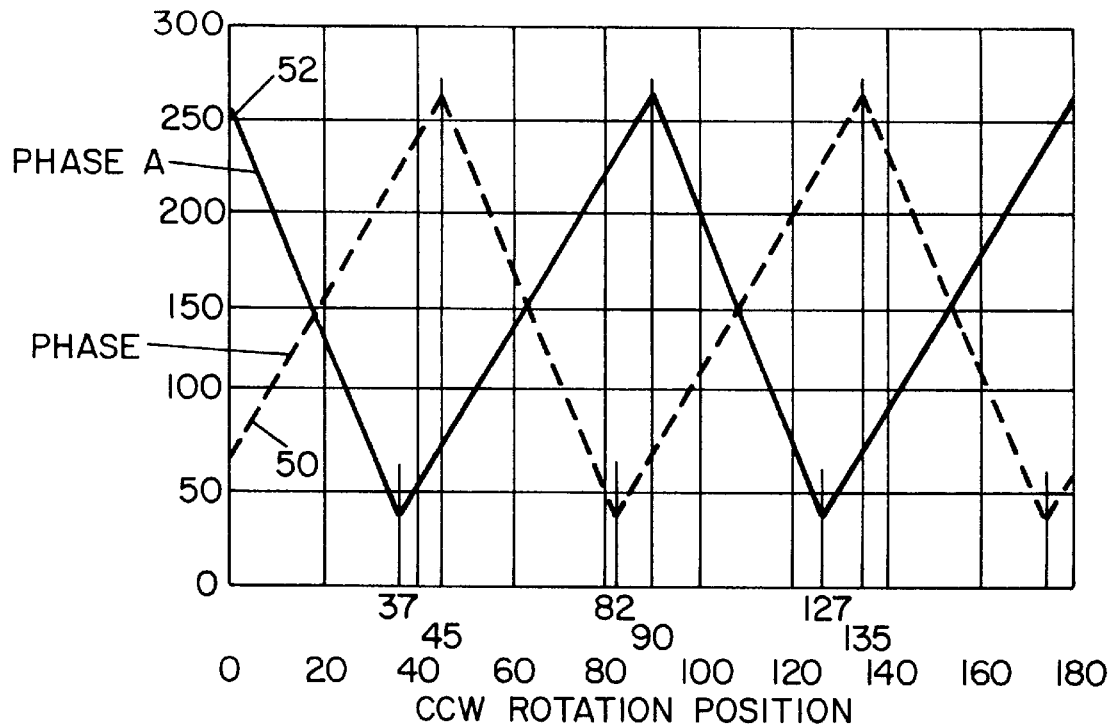
FIG. 6(A) is an exemplary ideal inductance profile of the phase A and phase B stator windings of FIG. 1 with respect to the counterclockwise mechanical progression of the rotor relative to the stator.
Figure 6B:
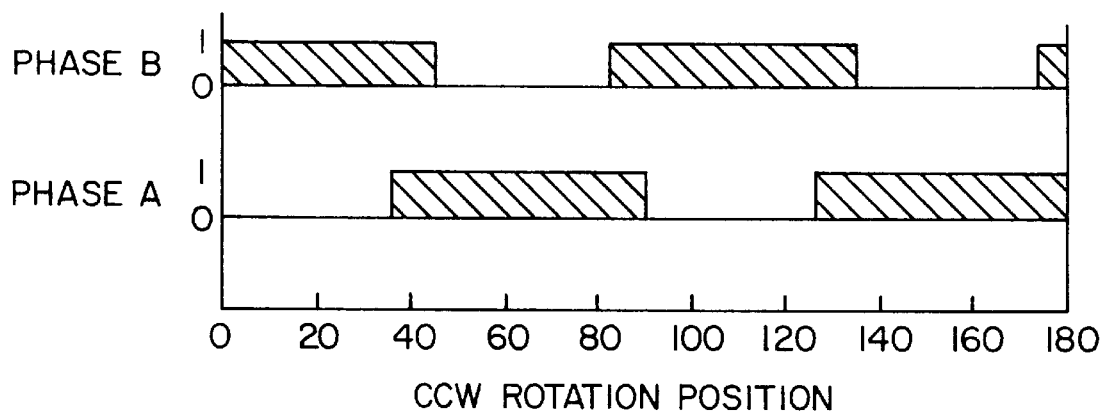
FIG. 6(B) is an ideal energization profile of the phase A and phase B windings of FIG. 1 for the inductance profile of FIG. 6(a)

The present invention produces in phase A and phase B windings 32a, 32b a change in inductance with angular position (dL/dθ) having a slope that increases at a first rate and decreases at a second rate. Specifically, with reference to FIG. 6A, and continuing reference to FIGS. 2–5, an exemplary ideal inductance profile for the change in inductance of the phase B windings and the phase A windings as a function of the position of rotor 40 and in relation to ideal energization of the phase A and phase B windings is illustrated. It is to be appreciated that FIG. 6A is for illustration purposes and is not to be construed as limiting the invention. At 0 degree rotor position, the phase B windings are energized in the absence of the energization of the phase A windings. In response, rotor 40 experiences a torque in a counterclockwise direction that urges rotor 40 towards a minimum reluctance, maximum inductance position with respect to stator 40. Concurrent with the increasing inductance of phase B windings 32b the inductance of phase A windings 32a is decreasing. As illustrated in FIG. 6A, the inductance of each phase of the novel pole configuration decreases more rapidly than it increases. This provides for advantageous overlap of the increasing inductance of phase A and phase B windings 32a, 32b. Specifically, at 37 degrees rotor position, the inductance of phase A windings 32a transitions from decreasing to increasing and phase A windings 32a are energized. Between 37 degrees and 45 degrees rotor position, both phase windings 32a, 32b are energized and the inductance of both phase windings is increasing. Accordingly, rotor 40 experiences torque from both phase A and phase B windings 32a, 32b. At 45 degrees rotation, and with phase A windings 32a energized, the phase B inductance transitions from increasing to decreasing and phase B windings 32b are deenergized. In this manner, rotor 40 experiences a positive torque in a counterclockwise direction from the energization of phase A windings 32a in cooperation with the increase in inductance thereof while avoiding a negative torque in a clockwise direction from the energization of phase B windings 32b in cooperation with the decrease in inductance thereof. At 82 degrees of rotation, the inductance of phase B windings 32b transitions from decreasing to increasing and phase B windings 32b are energized. Between 82 and 90 degrees of rotation the increasing inductance of phase A and phase B windings 32a, 32b in cooperation with the energization thereof imparts a torque to rotor 40. At 90 degrees of rotation, the inductance of phase A windings 32a transitions from increasing to decreasing and phase A windings 32a are deenergized such that torque is imparted onto rotor 40 exclusively from the increasing inductance of phase B in cooperation with the energization thereof. At 127 degrees rotation, the inductance of phase A transitions from decreasing to increasing and phase A windings 32a are energized. Accordingly, between 127 and 135 degrees rotor position, phase A and phase B windings 32a, 32b impart a torque to rotor 40. At 135 degrees rotation, the inductance of phase B windings 32b transitions from increasing to decreasing and phase B windings 32b are deenergized such that the torque imparted onto rotor 40 is exclusively from the increasing inductance of phase A in cooperation with the energization thereof.

From the foregoing, it should be appreciated that the present invention produces in phase A and phase B windings 32a, 32b a change in inductance as a function of the position of rotor 40 wherein the inductance of a phase winding increases at a different rate than the inductance thereof decreases. Specifically, the increasing inductance of each phase extends over a greater angular position than the decreasing inductance thereof.

Figure 7:
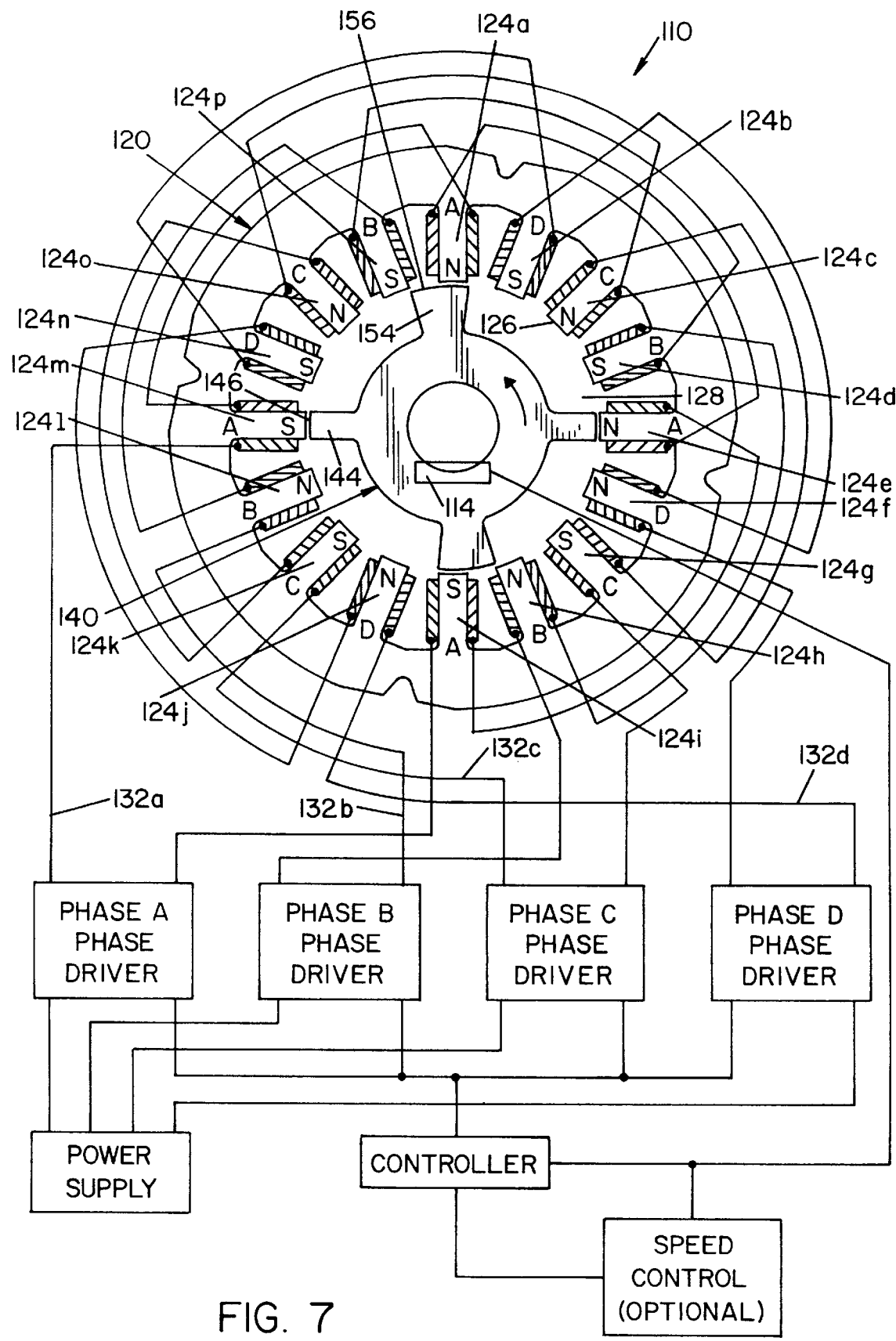
FIG. 7 is a sectional view of a 16/4, four phase motor illustrating an alternate embodiment of the present invention.

Referring now to FIG. 7, a four phase switched reluctance motor, designated 110, illustrating an alternate embodiment of the present invention is shown. Motor 110 is comprised of a stator 120 and a rotor 140. Stator 120 is preferably comprised of a stack of plate laminations (not shown) that are formed of a ferromagnetic material. The laminations are stacked face-to-face and suitably adhered to one another by means conventionally known in the art. Stator 120 includes a plurality of equally spaced, radially extending like stator poles 124 having concave stator pole faces 126. In the embodiment shown, stator 120 has sixteen (16) stator poles designated 124a–124p. A gap 128 is defined between adjacent stator poles 124. In the embodiment shown, each stator pole face 126 has a dimension approximately equal to the dimension of gap 128 between adjacent stator pole faces 126. In the embodiment shown, each stator pole face 126 has an angular dimension of about 11.25°, and each gap 128 has an angular dimension of about 11.25°. Stator pole face 126 defines a central bore 112 for receiving rotor 140.

An electrical conductor 132 is wound around each stator pole 124. As schematically illustrated in FIG. 7, conductors 132 are connected to an electrical current pulse generating circuit 134 having a phase A driver, a phase B driver, a phase C driver and a phase D driver. Conductors 132a are connected to the phase A driver, conductors 132b are connected to the phase B driver, conductors 132c are connected to the phase C driver and conductors 132d are connected to the phase D driver, as shown in FIG. 7, to create stator poles of four phases A, B, C and D. In the embodiment shown in FIG. 7, stator poles 124a, 124e, 124i and 124m are connected as A phase stator poles. Stator poles 124d, 124h, 124l and 124p are connected as B phase stator poles. Stator poles 124c, 124g, 124k and 124o are connected as C phase stator poles. Stator poles 124b, 124f, 124j and 124n are connected as D phase stator poles. As shown in FIG. 7, the stator poles are wound such that diametrically opposed stator poles 124 of the same phase have opposite polarities.

The current pulse generating circuit 134 is conventionally known in the art and is operable to selectively generate pulses of electrical current through phase conductors 132a, 132b, 132c and 132d. The timing of current pulses generated by current pulse generating circuit 134 is determined by position sensor 114. Position sensor 114 is located on shaft 160 and provides a signal indicative of the relative position of rotor 140 relative to stator 120.

Referring now to rotor 140, like stator 120, rotor 140 is preferably comprised of a stack of plate laminations that are formed of a ferromagnetic material. In the embodiment shown in FIG. 7, rotor 140 is comprised of like laminations. Like rotor 40 shown in FIGS. 1–5, rotor 140 has diametrically opposed narrow rotor poles 144 having narrow rotor pole faces 146, and diametrically opposed wide rotor poles 154 having wide rotor pole faces 156. Each narrow rotor pole face 146 is dimensioned to be slightly larger (preferably less than 2 radial degrees) than stator pole face 126. In the embodiment shown, narrow rotor pole face 146 has an angular dimension of about 12.5°. Wide rotor pole face 156 is dimensioned to be slightly larger than one stator pole face 126 and a gap 128 adjacent thereto. In the embodiment shown, wide rotor pole face 156 has an angular dimension of about 23.5°. Narrow rotor poles 144 and wide rotor poles 154 are oriented relative to each other, such that each narrow rotor pole face 146 is in alignment (i.e., spans) a stator pole face 126 of a particular phase stator pole when each wide rotor pole face 156 spans a stator pole face 126 of a stator pole 124 of the same particular phase and a gap 128 adjacent thereto. As illustrated in FIG. 7, when narrow rotor poles 144 are in alignment with phase A stator poles 124e and 124m, wide rotor poles 154 are in alignment with phase A stator poles 124a and 124i and a gap 128 adjacent to each.

Referring now to the operation of motor 110, as will be appreciated from the previous discussion of the embodiment shown in FIGS. 1–5, counterclockwise rotation of rotor 140 is created by the energization of phases A, B, C and D in sequence and by the repetition of such energization sequence. More specifically, FIG. 7 shows the position of rotor 140 relative to stator 120, immediately prior to energization of phase B. When phase B is energized, the leading edges of wide rotor poles 154 will be drawn into positions of minimum reluctance with respect to energized stator poles 124h, 124p (the minimum reluctance position being where the leading half of wide rotor pole 154 overlaps and is in alignment with energized stator poles 124h and 124p). The interaction between wide rotor poles 154 of rotor 140 and energized phase B stator poles 124p and 124h produces the first half of the phase B angular rotation. Further rotation of rotor 140 during phase B energization is created by narrow rotor pole 144 being drawn into minimum reluctance position with respect to energized phase B stator poles 124d and 124i. As will be appreciated, when narrow rotor poles 144 are in alignment with energized stator poles 124d and 124l, the energization of phase D and the deenergization of phase B will cause wide rotor poles 154 to move into minimum reluctance position with energized phase C stator poles 124o and 124g. Further rotation of rotor 140 during phase C energization is caused by narrow rotor poles 144 being drawn into minimum reluctance position (i.e., alignment) with energized phase C stator poles 124c and 124k. In similar respects, subsequent energization of phase D and deenergization of phase C will cause angular rotation of rotor 140 in a like manner. In the embodiment shown, each phase energization produces 22.5 degrees of angular rotation of rotor 140.

FIG. 7 illustrates a directional, four phase switched reluctance motor utilizing the two step rotor rotation (per phase energization) according to the present invention. FIG. 7 thus illustrates that the present invention is not limited to a two phase switched reluctance motor, but that the present invention finds advantageous application in multi-phase switched reluctance motors having two or more phases.

Figure 8:
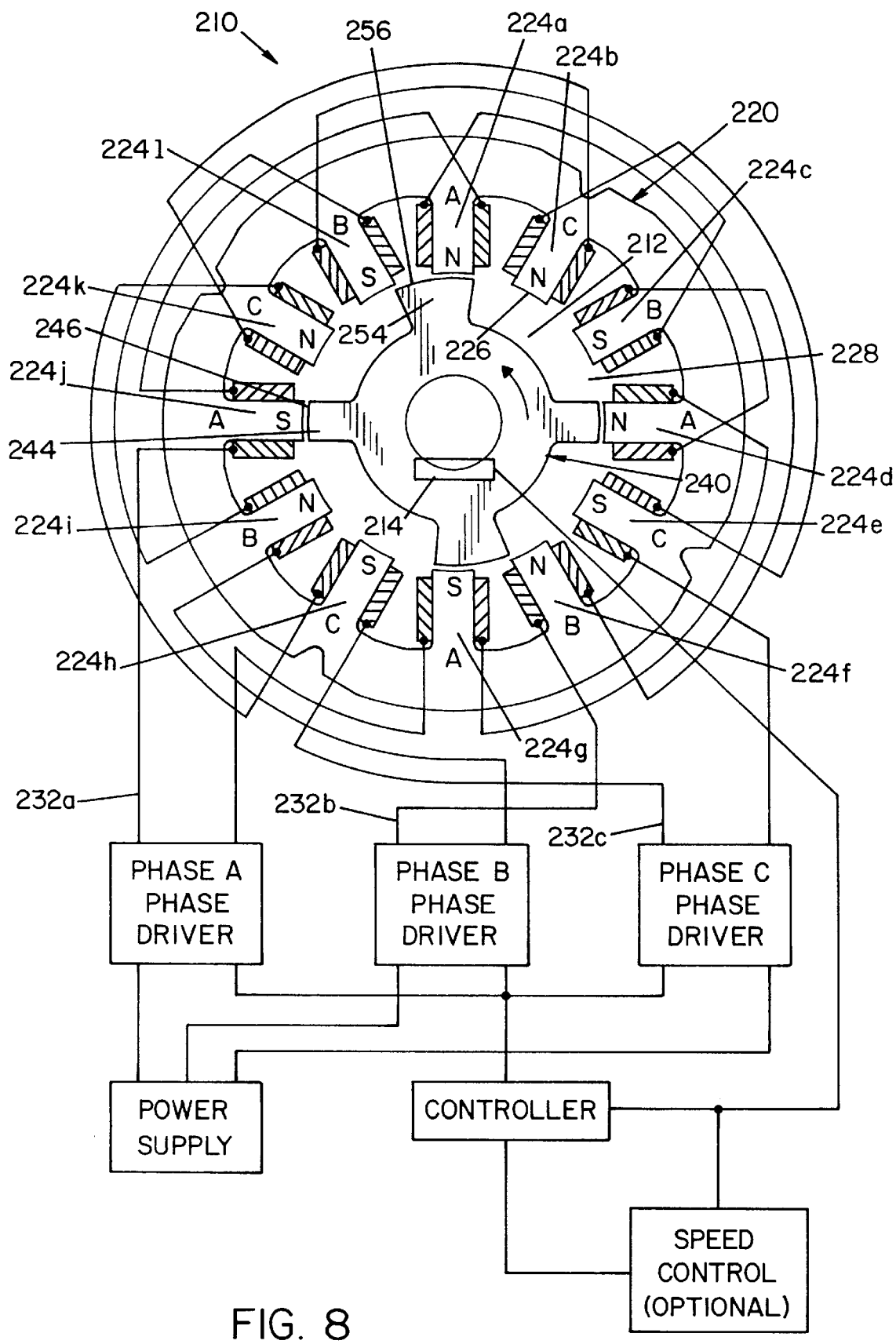
FIG. 8 is a sectional view of a 12/4, three phase motor illustrating another embodiment of the present invention.

FIG. 8 illustrates a three phase motor designated 210 illustrating a third embodiment of the present invention. Motor 210 is comprised of a stator 220 and a rotor 240. Stator 220 is comprised of a stack of plate laminations (not shown). The laminations are stacked face-to-face and suitably adhered to one another by means conventionally known in the art. Stator 220 includes a plurality of equally spaced, radially oriented like stator poles 224 having concave stator pole faces 226. In the embodiment shown in FIG. 8, stator 220 has twelve (12) stator poles designated 224a–224l. A gap 228 is defined between adjacent stator poles. In the embodiment shown in FIG. 8, each stator pole face 226 has an angular dimension approximately equal to the angular dimension of gap 228 defined between adjacent stator poles 224. In the embodiment shown, each stator pole face 226 has an angular dimension of about 15°, and each gap 228 has an angular dimension of about 15°. Stator pole faces 226 define a central bore 212 for receiving rotor 240.

Electrical conductors 232a, 232b and 232c are wound about stator poles 224. As schematically illustrated in FIG. 8, conductors 232a, 232b, 232c are connected to an electrical current pulse generating circuit 234 having a phase A driver, a phase B driver and a phase C driver. Conductors 232a are connected to phase A driver, conductors 232b are connected to the phase B driver, and conductors 232c are connected to phase C driver. In the embodiment shown, stator poles 224a, 224d, 224g and 224j are connected as A phase stator poles; stator poles 224c, 224f, 224i and 224l are connected as phase B stator poles; and stator poles 224b, 224e, 224h and 224k are connected as C phase stator poles. Diametrically opposed stator poles of the same phase have opposite polarities. As indicated above, current pulse generating circuits such as circuit 234 are conventionally known in the art. Circuit 234 is operable to selectively to generate pulses of electrical current through conductors 232a, 232b and 232c. The timing of current pulses generated by current pulse generating circuit 234 is determined by position sensor 214. Position sensor 214 is connected between stator 220 and rotor 240 and provides a signal indicative of the relative position of rotor 240 relative to stator 220.

Referring now to rotor 240, like stator 220, rotor 240 is preferably comprised of a stack of plate laminations. Rotor 240 has diametrically opposed narrow rotor poles 244 having narrow rotor pole faces 246 and diametrically opposed wide rotor poles 254 having wide rotor pole faces 256. As indicated in prior embodiments, narrow rotor pole face 246 is dimensioned to be slightly larger than a stator pole face 226, and wide rotor pole face 256 is dimensioned to be slightly larger than one stator pole face 226 and a gap 228 adjacent thereto. In the embodiment shown, narrow rotor pole face 246 has an angular dimension of about 16 degrees and wide rotor pole face 256 has an angular dimension of about 31 degrees. As in the previous embodiments, narrow rotor poles 244 and wide rotor poles 254 are oriented relative to each other such that each narrow rotor pole face 246 is in alignment with a stator pole face 226 of a particular phase when each wide rotor pole face 256 spans a stator pole face 226 of the same phase and a gap adjacent such stator pole.

The operation of motor 210 is the same as that previously described, wherein sequential energization of phases A, B and C will produce directional, angular rotation as wide rotor poles 254 are brought into positions of minimum reluctance with energized stator poles of a particular phase to produce a first portion of the phase angular rotation and the second phase of angular rotation occurs as narrow rotor poles 244 are brought into alignment with energized stator poles of the same phase. In the embodiment shown in FIG. 8, each phase energization produces an angular rotation of rotor 240 of approximately 30°. FIGS. 7 and 8 thus illustrate how the present invention finds advantageous application in switched reluctance motors of any number of phases.

Figure 9:
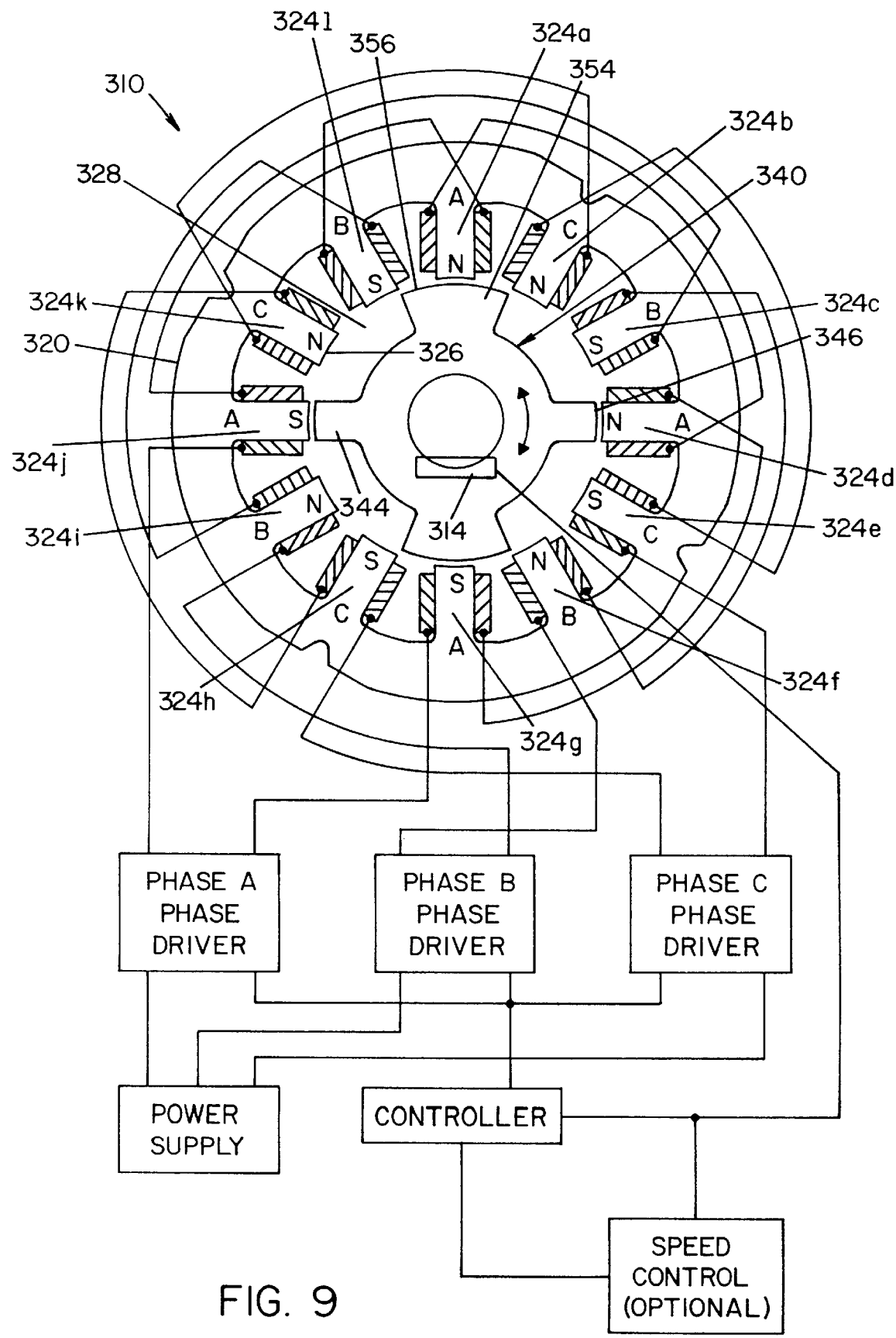
FIG. 9 is a sectional view of a 12/4, three phase motor illustrating a still further embodiment of the present invention.

Referring now to FIG. 9, a three phase motor designated 310 illustrating another embodiment of the present invention is shown. Motor 310 is comprised of a stator 320 and a rotor 340. Stator 320 is comprised of a stack of plate laminations (not shown) that are formed of a ferromagnetic material. The laminations are stacked face-to-face and suitably adhered to one another by means conventionally known in the art. Stator 320 includes a plurality of equally spaced, radially oriented, like stator poles 324 having stator pole faces 326. In the embodiment shown, stator 320 has twelve (12) stator poles designated 324a–324l. Stator 320 shown in FIG. 8 is essentially similar to stator 220 shown in FIG. 7. A gap 328 is defined between adjacent stator poles 324. In the embodiment shown in FIG. 9, stator pole faces 326 are dimensioned to have an angular dimension approximately equal to the angular dimension of gap 328. In the specific 12 pole stator shown in FIG. 9, stator pole face 326 has an angular dimension equal to about 15° and gap 328 has an angular dimension equal to about 15°. Stator pole faces 326 define a central bore 312 for receiving rotor 340.

Electrical conductors 332a, 332b and 332c are wound around stator poles 324. As schematically illustrated in FIG. 8, conductors 332a, 332b, 332c are connected to an electrical current pulse generating circuit 334 having a phase A driver, a phase B driver and a phase C driver. Conductors 332a are connected to the phase A driver, conductors 332b are connected to the phase B driver, and conductors 332c are connected to the phase C driver, as shown in FIG. 8, to create stator poles of three phases A, B and C. In the embodiment shown, stator poles 324a, 324d, 324g and 324j are connected as A phase stator poles, stator poles 324c, 324f, 324i and 324l are connected as B phase stator poles, and stator poles 324b, 324e, 324h and 324k are connected as C phase stator poles. As shown in FIG. 8, diametrically opposed stator poles of the same phase have opposite polarities.

As indicated above, current pulse generating circuits are conventionally known in the art. In the embodiment shown, current pulse generating circuit 334 is operable to selectively generate pulses of electrical current through conductors 332a, 332b and 332c. The timing of the current pulses and the sequence of the phase energization generated by current pulse generating circuit 334 are determined by a controller utilizing a position sensor 314. Position sensor 314 is connected between stator 320 and rotor 340 and provides a signal indicative of the relative position of rotor 340 relative to stator 320.

Referring now to rotor 340, like stator 320, rotor 340 is preferably comprised of a stack of plate laminations that are formed of a ferromagnetic material. Rotor 340 has diametrically opposed narrow rotor poles 344 having narrow rotor pole faces 346 and diametrically opposed wide rotor poles 354 having wide rotor pole faces 356. As in previous embodiments, narrow rotor pole face 346 is dimensioned to be slightly larger than a stator pole face 326. Wide rotor pole 354 is a modification of those previously discussed in FIGS. 1–8. Specifically, wide rotor pole 354 has a wide rotor pole face 356 that is dimensioned to be slightly larger than one stator pole face 326 and the two (2) gaps 328 adjacent thereto. In other words, wide rotor pole face 356 has an angular dimension equal to approximately three times the angular dimension of a stator pole face 326. In the embodiment shown, narrow rotor pole face 346 has an angular dimension of about 16°. Wide rotor pole face 356 has an angular dimension of about 47°. Narrow rotor poles 344 and wide rotor poles 354 are oriented relative to each other such that when each narrow rotor pole face is in alignment with a stator pole face 326 of a particular phase, each wide rotor pole face 356 spans a stator pole face 326 of a stator pole 324 of the same particular phase and the gaps 328 adjacent thereto, as illustrated in FIG. 9.

Referring now to the operation of motor 310, FIG. 9 shows the position of rotor 340 at the end of a phase A energization, wherein narrow rotor poles 344 and wide rotor poles 354 are in minimum reluctance relationship with the phase A stator poles 324d, 324j and 324a and 324g, respectively. As will be appreciated from the previous discussion regarding the operation of the prior embodiments, energization of phase B will initiate counterclockwise rotation of rotor 340. Subsequent energization of phase C followed by a repetitive, sequential energization of phases A, B and C will produce counterclockwise rotation of rotor 340.

Alternately, with rotor 340 in the position shown in FIG. 9, if phase C is energized, rotor 340 will begin moving in a clockwise direction as wide rotor poles 354 move to positions of minimum reluctance with energized phase C stator poles 324b and 324h. Subsequent energization of phase B, followed by repeated, sequential energization of phases A, C and B, will produce rotation of rotor 340 in a clockwise direction.

As will be appreciated from the previous discussion of the embodiments disclosed in FIGS. 1–8, because of the width of wide stator pole 354, initial energization of phase B or phase C will cause wide rotor poles 354 to move into minimum reluctance position with stator poles of the energized phase, and thereafter, narrow rotor poles 344 will be drawn into minimum reluctance position with energized stator poles of the same phase. If, from the position shown in FIG. 9, phase C is energized, rotor 340 will move clockwise, and further sequential energization of the phases in a B-A-C sequence will produce clockwise rotation of rotor 340. Alternately, if, from the position shown in FIG. 9, phase B is energized followed by a repetitive, sequential energization of the phase in a C-A-B sequence, rotor 340 will rotate in a counterclockwise direction. The embodiment shown in FIG. 9 thus provides a bidirectional motor utilizing the concepts of the present invention.

In addition to providing bi-directional operation, it will likewise be appreciated that depending upon the sequence of the phase energizations, the motor shown in FIG. 9 is capable of reciprocal or oscillating motion. In this respect, from the position shown in FIG. 9, the phases may be energized in a sequence wherein rotor 340 is rotated in a clockwise direction for three phase energizations, i.e., energization of phases in a C-B-A sequence followed by energization of the phases in a B-C-A-B-C sequence will cause rotor 340 to move first in a clockwise direction, followed by movement in a counterclockwise direction. A motor having such characteristics may find advantageous application in a washing machine.

Figure 10:
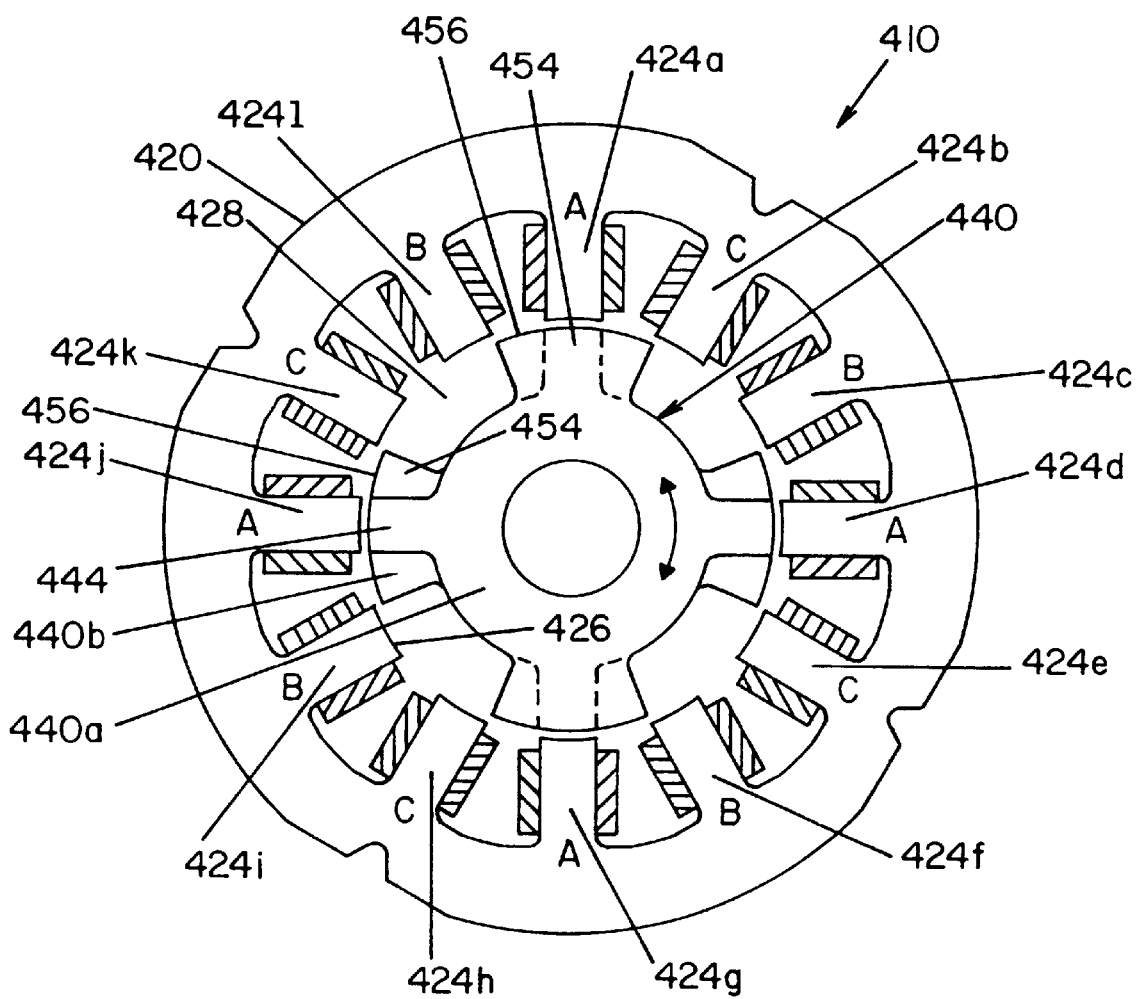
FIG. 10 is a sectional view of a 12/4, three phase motor illustrating an alternate embodiment of the motor shown in FIG. 9.

Referring now to FIG. 10, an alternate embodiment of the present invention, and more specifically, an alternate embodiment of the motor 310 shown in FIG. 8 is disclosed. FIG. 10 shows a motor, designated 410, having a stator 420 and a rotor 440. Stator 420 is basically identical to stator 320 shown and discussed with respect to FIG. 9. In the embodiment shown in FIG. 10, rotor 440 is comprised of like laminations assembled into groups to form rotor elements wherein adjacent groups of laminations, i.e., rotor elements, are offset, i.e., angularly rotated relative to each other. Adjacent rotor elements are preferably angularly offset by an amount equal to the angular spacing between adjacent poles of the same phase. In the embodiment shown in FIG. 10, adjacent rotor elements 440a, 440b are offset 90° relative to each other, 90° being the angular spacing between stator poles of the same phase. Each rotor element 440a, 440b preferably has a like number of rotor laminations therein; however, it will be appreciated that each rotor element may have a dissimilar number of laminations therein. The rotor laminations are adhered to one another by conventional means known to produce a rotor 340.

By orienting adjacent rotor elements 440a, 440b 90° relative to each other, a more balanced force distribution is provided during each phase energization. In this respect, as shown in FIG. 10, when rotor 440 is in minimum reluctance position with respect to phase A stator poles, narrow rotor poles 444 in rotor element 440a are aligned with phase A stator poles 424d and 424j, and at the same time narrow rotor poles 444 in rotor element 440b are aligned with phase A stator poles 424a, 424g. The embodiment shown in FIG. 10 thus provides not only bi-directional and reciprocating capability, as disclosed in the embodiment shown in FIG. 9, but also provides a more balanced force distribution by offsetting elements of rotor 440 relative to the stator poles.

The foregoing description discloses preferred embodiments of the invention. The embodiments are described for the purpose of illustration only. It will be appreciated that numerous alterations and modifications may be practiced by those skilled in the art without departing from the spirit and scope of the present invention. For example, wherein FIGS. 9 and 10 show how a rotor may be split into sections or elements, and how the sections or elements may be offset to provide a more balanced force distribution, similar modifications may be made to the embodiments shown in FIGS. 1–8. Moreover, although the embodiments show an inner rotor and outer stator, motors having an outer rotor and an inner stator having radially oriented stator poles are contemplated by the present invention. It is intended that all such modifications and alterations be included insofar as they come within the scope of the invention as claimed or equivalents thereof.

Having described the invention, what is claimed is:

1. A switched reluctance motor, comprising:

a stator having a plurality of evenly spaced, radially oriented, like stator poles that define a gap between adjacent stator poles;

windings for three phases wound about said stator poles wherein a stator pole of a first phase is disposed circumferentially between a winding and an associated stator pole of a second phase and a winding and an associated stator pole of a third phase; and a rotor mounted for rotation relative to said stator, said rotor having an even number of rotor poles, said rotor poles being dimensioned such that when one of said phases is energized, said rotor poles operatively interact with said energized stator poles such that said motor moves from a first state wherein half of said rotor poles are magnetically coupled to a like number of said stator poles to a second state wherein all of said rotor poles are magnetically coupled to a like number of stator poles.

2. A switched reluctance motor as defined in claim 1, wherein said motor has more than three phases.

3. A switched reluctance motor as defined in claim 1, wherein said rotor has at least one narrow rotor pole and at least one wide rotor pole, and said narrow rotor pole has a narrow rotor pole face that is dimensioned to be approximately equal to a stator pole face and said wide rotor pole has a wide rotor pole face that spans at least a stator pole face and a gap adjacent a stator pole face.

4. A switched reluctance motor as defined in claim 1, wherein said motor includes a second rotor element, said second rotor element being identical in cross-section to said rotor element and being angularly offset from said rotor element about an axis of rotation of said rotor element.

5. A switched reluctance motor as defined in claim 4, wherein said second rotor element is offset from said rotor element an angular amount equal to the angular spacing between adjacent stator poles of the same phase.

6. A switched reluctance motor as defined in claim 3, wherein said wide rotor pole has a dimension equal to about three (3) times the dimension of a stator pole face.

* * * * *